(12) United States Patent
Gu (10) Patent No.: US 7,253,831 B2
(45) Date of Patent: Aug. 7, 2007

(54) VIDEO CODING USING MULTIPLE BUFFERS

(75) Inventor: Qunshan Gu, Londonderry, NH (US)

(73) Assignee: Polycom, Inc., Pleasanton, CA (US)

( * ) Notice: Subject to any disclaimer, the term of this patent is extended or adjusted under 35 U.S.C. 154(b) by 1559 days.

(21) Appl. No.: 09/852,977

(22) Filed: May 10, 2001

(65) Prior Publication Data

US 2002/0092030 A1 Jul. 11, 2002

Related U.S. Application Data

(60) Provisional application No. 60/209,005, filed on Jun. 2, 2000, provisional application No. 60/203,004, filed on May 10, 2000.

(51) Int. Cl.
*H04N 7/14* (2006.01)
(52) U.S. Cl. .............................. 348/14.09; 348/14.12; 348/14.13
(58) Field of Classification Search .. 348/14.01–14.09, 348/14.1, 14.11, 14.12, 14.13, 407.1, 402.1; 375/240.06, 240.14, 240.15, 240.16, 240.25, 375/240.26, 240.27
See application file for complete search history.

(56) References Cited

U.S. PATENT DOCUMENTS 5,926,225 A 7/1999 Fukuhara et al.

6,381,275 B1 * 4/2002 Fukuhara et al. ...... 375/240.06

FOREIGN PATENT DOCUMENTS

| EP | 0817491 A2 | | 1/1998 |
|---|---|---|---|
| EP | 0849950 A2 | | 6/1998 |
| JP | 405064184 A | * | 3/1993 |
| WO | WO 00/56077 A1 | | 9/2000 |

* cited by examiner

*Primary Examiner*—Melur Ramakrishnaiah
(74) *Attorney, Agent, or Firm*—Wong, Cabello, Lutsch, Rutherford & Brucculeri, LLP (57) ABSTRACT

There is provided herein a system for video encoding and decoding that uses short-term and long-term buffers. Reconstruction of each block within an image may be performed with reference to one of the buffers, so that different portions of an image, or different images in a sequence, may be reconstructed using different buffers. There is also provided herein systems for signaling, between an encoder and a decoder, the use of the above buffers and related address information. The encoder may, for example, transmit information identifying video data as corresponding to a particular one of the buffers, and the decoder may transmit information relating to the size of the short-term and the long-term buffer. The buffer sizes may be changed during transmission of video data by including buffer allocation information in the video data. Also disclosed herein are methods and apparatuses according to the above.

26 Claims, 5 Drawing Sheets

VIDEO CODING USING MULTIPLE BUFFERS

RELATED APPLICATIONS

This application claims the benefit of, and incorporates by reference, the entire disclosure of U.S. Provisional Patent Application No. 60/203,004 filed on May 10, 2000 and U.S. Provisional Patent Application No. 60/209,005 filed on Jun. 2, 2000.

BACKGROUND OF THE INVENTION

Differential video encoding techniques are known in which new images are created with reference to previous video data. Some transmitted data may contain all of the information required for still image reconstruction, while other transmitted data may contain differential information describing changes to a reference image that has been previously decoded. The differential information is combined with the reference frames to reconstruct new images. Differential encoding may provide significant compression because it alleviates the need to transmit a complete series of still images otherwise required for moving video. As a significant disadvantage, existing video systems do not permit variable handling of reference data according to how long the reference data may usefully serve as a reference for reconstructing new images.

There remains a need for a video coding system that permits a dynamic allocation of a decoder picture memory between short-term and long-term memory.

SUMMARY OF THE INVENTION

There is provided herein a system for video encoding and decoding that uses short-term and long-term buffers. Reconstruction of each block within an image may be performed with reference to one of the buffers, so that different portions of an image, or different images in a sequence, may be reconstructed using different buffers. There is also provided herein systems for signaling, between an encoder and a decoder, the use of the above buffers and related address information. The encoder may, for example, transmit information identifying video data as corresponding to a particular one of the buffers, and the decoder may transmit information relating to the size of the short-term and the long-term buffer. The buffer sizes may be changed during transmission of video data by including buffer allocation information in the video data. Also disclosed herein are methods and apparatuses according to the above.

A method of processing video signals described herein may include providing a memory; allocating the memory between a first buffer and a second buffer; receiving a video signal that includes video data for reconstructing an image; generating image data representative of the image from the video data; decoding control data from the video signal that specifies whether the image data is long-term data or short-term data; storing the image data in the first buffer when the image data is short-term data; and storing the image data in the second buffer when the image data is long-term data.

The method may include decoding data from the video signal that identifies the image data as short-term data or long-term data. The method may include decoding an index from the video signal, when the image data is long-term data, that specifies a location of the second buffer, and storing the long-term data in the location. The method may include decoding control data from the video signal that specifies whether the image data is to be reconstructed from a reference image in a short-term buffer or a long-term buffer, and selecting a reference image from one of a short-term buffer or a long-term buffer according to the control data. The method may include reconstructing a first portion of the image using a first reference image in a short-term buffer, and reconstructing a second portion of the image using a second reference image in a long-term buffer. The method may include storing the image data in the first buffer includes at least one of storing the image data in a first location that is unused, when an unused location exists, and storing the image data in a second location that contains a least recently received image data, when no unused location exists.

The video signal may include a first parameter that specifies that the image data is long-term data and a second parameter that specifies a location of the second buffer where the image data should be stored. The method may further include decoding from the video signal a new allocation of the memory between one or more short-term buffers and one or more long-term buffers. The video signal may include at least one of a block, a group of blocks, a macroblock, or a frame. The method may include detecting an error in the video data and signaling the error to an encoder on a back-channel. The method may include decoding one or more variable length fields in the video signal. The short-term image data in the first buffer may stored in a first-in-first-out manner and indexed sequentially. The long-term image data in the second buffer may be stored according to a long-term buffer index included in the video signal.

The method may include deallocating at least one of the first buffer or the second buffer based upon allocation data decoded from the video signal. The video data may include differential video data that specifies differences between the image and a reference image. The video data may be reference data for the image, the reference data being used as the image data.

A computer program product for processing video signals as described herein may include computer executable code for allocating a memory between a first buffer and a second buffer; computer executable code for decoding a video signal that includes video data for reconstructing an image; computer executable code for generating image data representative of the image from the video data; computer executable code for decoding control data from the video signal that specifies whether the image data is long-term data or short-term data; computer executable code for storing the image data in the first buffer when the image data is short-term data; and computer executable code for storing the image data in the second buffer when the image data is long-term data.

A video processing system as described herein may include a memory; an allocating means for allocating the memory between a first buffer and a second buffer; a receiving means for receiving a video signal that includes video data for reconstructing an image; a generating means for generating image data representative of the image from the video data; a decoding means for decoding control data from the video signal that specifies whether the image data is long-term data or short-term data; and a storing means for storing the image data in the first buffer when the image data is short-term data, and for storing the image data in the second buffer when the image data is long-term data.

Another method for processing video signals as described herein may include providing a memory; allocating the memory between a short-term buffer and a long-term buffer;

storing a long-term reference image in the long-term buffer and a short-term reference image in the short-term buffer; receiving a video signal that includes video data for reconstructing an image; decoding control data from the video signal that specifies a reference image for reconstructing the image, the reference image being at least one of the short-term reference image or the long-term reference image; and generating image data representative of the image from the video data and the reference image.

Another method for processing video signals as described herein may include providing a memory; allocating the memory between a short-term buffer and a long-term buffer; storing a long-term reference image in the long-term buffer and a short-term reference image in the short-term buffer; receiving a video signal that includes video data for reconstructing an image; decoding first control data from the video signal that specifies a reference image for reconstructing the image, the reference image being at least one of the short-term reference image or the long-term reference image; generating image data representative of the image from the video data and the specified reference image; decoding second control data from the video signal that specifies a buffer for storing the image data, the specified buffer being at least one of a second short-term buffer or a second long-term buffer; and storing the image data in the specified buffer.

Another method for processing video signals as described herein may include providing a memory; allocating the memory between a short-term buffer and a long-term buffer; storing a long-term reference image in the long-term buffer and a short-term reference image in the short-term buffer; receiving a video signal that includes video data for reconstructing an image; decoding control data from the video signal that specifies a reference image for reconstructing the image, the reference image being at least one of the short-term reference image or the long-term reference image; and generating image data representative of the image from the video data and the reference image.

A decoder for processing video signals as described herein may include a memory; a buffer allocation decoder configured to allocate the memory between a long-term buffer and a short-term buffer; a video input that receives a video signal that includes video data for reconstructing an image; a picture decoder that generates image data representative of the image from the video data; and an image storage control that decodes control data from the video signal that specifies whether the image data is long-term data or short-term data, and stores the image data in the short-term buffer when the image data is short-term data, and stores the image data in the long-term buffer when the image data is long-term data.

A system for video conferencing as described herein may include an encoder, the encoder configured to encode differential image data with reference to at least one of a short-term image or a long-term image, and to include in a video signal an indication of a type of reference image data that the differential image data is to be reconstructed with, the type being at least one of referring to a long-term image or a short term image; a decoder, the decoder configured to decode the differential image data and the indication of the type of the differential image data, and to generate a reconstructed image based upon the differential image data and reference image data in a location specified by the type; and a video conferencing network that connects the encoder and the decoder in a communicating relationship. In the system, the encoder and the decoder may be configured to communicate a type of the reconstructed image, the decoder storing the reconstructed image in a buffer corresponding to the type.

A data signal embodied on a video conferencing carrier wave, as described herein, may include a picture identification number assigned sequentially to a picture; a flag that indicates whether the data signal includes a number of long-term buffers value; a picture property change indicator that indicates a change of image data between short-term data, long-term data, and unused data; a number of buffers for remapping field specifying reallocation instructions; a picture buffering mode that signals a way that a current image is to be stored, the way being at least one of as a long-term image or a short-term image; and a picture buffer identification that signals a location where a current image is to be stored, the location being at least one of an index for a long-term buffer or an identification number for a short-term buffer.

The data signal may further include a number of long-term buffers value that specifies a maximum number of long-term buffers allowed for use by a decoder receiving the data signal. The data signal may further include address information for changing picture properties, the address information including at least one of a difference of short-term picture identifier specifying a difference between a current short-term picture and a previous short-term picture, or a long-term picture index specifying an index for a long-term buffer. The data signal may further include a long-term/short-term buffer indication, an absolute difference of picture identification, and a sign of difference.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including an H.263 video conferencing system using multiple buffers for reference data. However, it will be understood by those of ordinary skill in the art that the methods and systems described herein may be suitably adapted to other differential video coding techniques, such as Moving Picture Experts Group ("MPEG") standards, Audio Visual Interleave ("AVI"), or Multiple-image Network Graphics ("MNG"). All such adaptations and modifications that would be clear to one of ordinary skill in the art are intended to fall within the scope of the invention described herein. As used herein, terms such as "image", "image data", "picture", "picture data", "video", "video data", and "video stream" are intended to refer generally to any form video data, unless specifically stated otherwise. This includes reference images (which may be, for example, luminance and chrominance data), differential data, motion vectors, sequential identifiers, and any other coding and control information, whether relating to blocks, macro-blocks, frames, or any other partial or complete image representation, however encoded.

Figure 1:
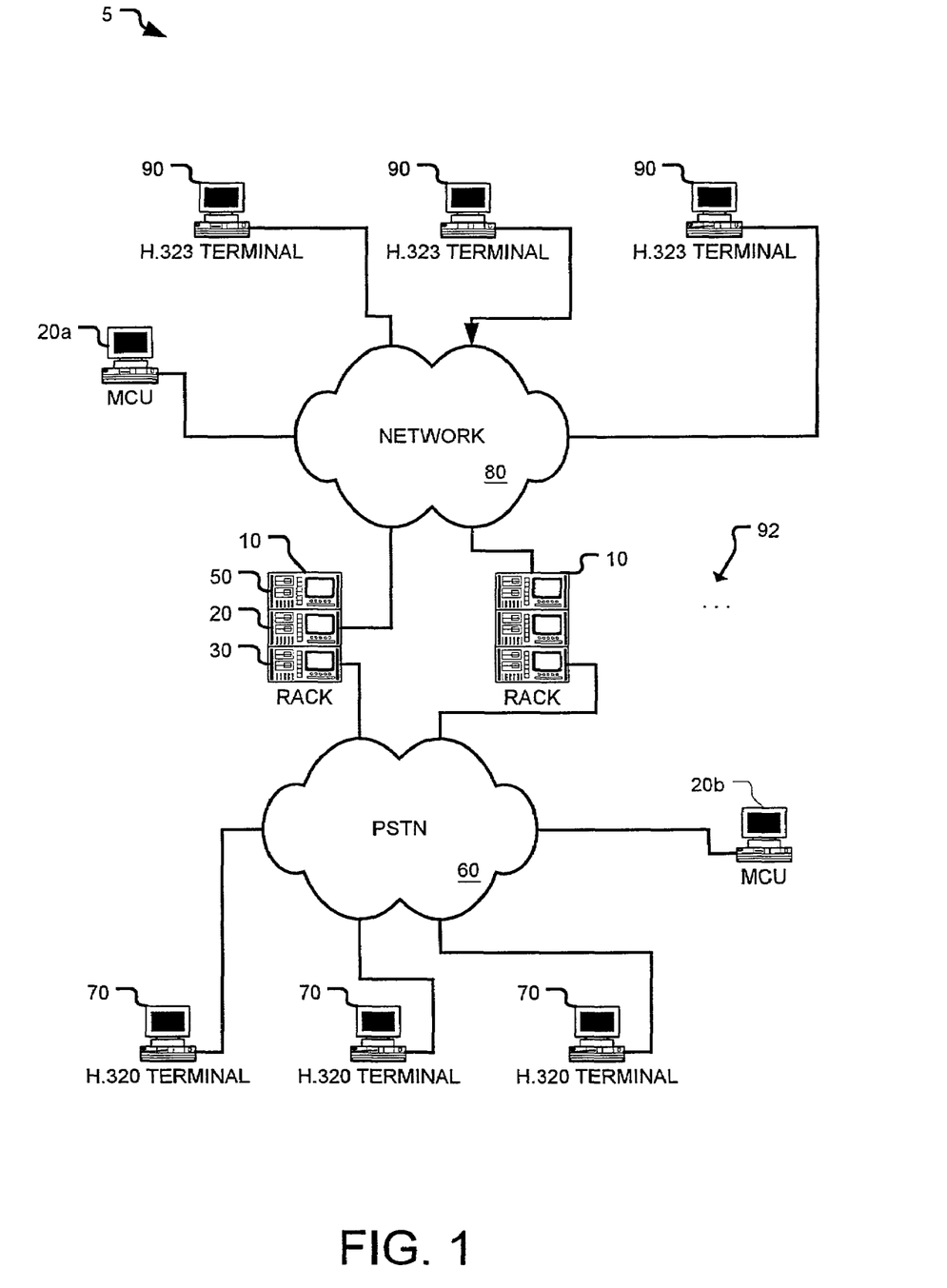
FIG. 1 shows a video conferencing system that may be used with the invention.

FIG. 1 shows a video conferencing system that may be used with the invention. In a video conferencing network 5, a rack 10 may include a multi-point conference unit ("MCU") 20, a gateway 30, and hardware/software for other services. The gateway 30 may provide one or more connections to the Public Switched Telephone Network 60, for example, through high speed connections such as Integrated Services Digital Network ("ISDN") lines, T1 lines, or Digital Subscriber Lines ("DSL"). A plurality of PSTN video conferencing ("VC") terminals 70 may also be connected in a communicating relationship with the PSTN 60, and may be accessible using known telecommunications dialing and signaling services. The MCU 20 may be connected in a communicating relationship with the Internet 80. A plurality of Internet Protocol ("IP") VC terminals 90 may also be connected in a communicating relationship with the Internet 80, and may be accessible using known data networking techniques, such as IP addressing.

It will be appreciated that, although the following description refers to an IP network 80 and the PSTN 60, any network for connecting terminals may be usefully employed according to the principles of the invention. The IP network 80, for example, may be any packet-switched network, a circuit-switched network (such as an Asynchronous Transfer Mode ("ATM") network), or any other network for carrying data, and the PSTN 60 may be any circuit-switched network, or any other network for carrying circuit-switched signals or other data. It will additionally be appreciated that the PSTN 60 and/or the IP network 80 may include wireless portions, or may be completely wireless networks. It will also be appreciated that the principles of the invention may be usefully employed in any multimedia system.

It will be appreciated that the components of the rack 10, such as the MCU 20, the gateway 30, and the other services 50, may be realized as separate physical machines, as separate logical machines on a single physical device, or as separate processes on a single logical machine, or some combination of these. Additionally, each component of the rack 10, such as the gateway 30, may comprise a number of separate physical machines grouped as a single logical machine, as for example, where traffic through the gateway 30 exceeds the data handling and processing power of a single machine. A distributed video conferencing network may include a number of racks 10, as indicated by an ellipsis 92.

Each PSTN VC terminal 70 may use an established telecommunications video conferencing standard such as H.320. H.320 is the International Telecommunication Union telecommunications ("ITU-T") standard for sending voice and audio over the PSTN 60, and provides common formats for compatible audio/video inputs and outputs, and protocols that allow a multimedia terminal to utilize the communications links and synchronize audio and video signals. The T.120 standard may also be used to enable data sharing and collaboration. Each PSTN VC terminal 70 may include inputs such as a microphone, video camera, and keyboard, and may include outputs such as a display and a speaker. The H.320 and T.120 standards may be implemented entirely in software on a computer, or in dedicated hardware, or in some combination of these. Each PSTN VC terminal 70 may include coder/decoders ("codecs") for different media. Video codecs may include codecs for standards such as H.261 FCIF, H.263 QCIF, H.263 FCIF, H.261 QCIF, and H.263 SQCIF. These are well known teleconferencing video standards that define different image size and quality parameters. Audio codecs may include codecs for standards such as G.711, G.722, G.722.1, and G.723.1. These are well known teleconferencing audio standards that define audio data parameters for audio transmission. Any other proprietary or non-proprietary standards currently known, or that may be developed in the future, for audio, video, and data may likewise be used with the invention, and are intended to be encompassed by this description. For example, current H.320 devices typically employ monaural sound, however, the principles of the invention may be readily adapted to a conferencing system employing stereo coding and reproduction, or any other spatial sound representation.

The gateway 30 may communicate with the PSTN 60, and may translate data and other media between a form that is compatible with the PSTN 60 and a form that is compatible with the Internet 80, including any protocol and media translations required to transport media between the networks.

Each IP VC terminal 90 may use an established data networking video conferencing standard such as H.323. H.323 is the ITU-T standard for sending voice and audio over data networks using IP, and provides common formats for compatible audio/video inputs and outputs, and protocols that allow a multimedia terminal to utilize the communications links and synchronize audio and video signals. The T.120 standard may also be used to enable data sharing and collaboration. Each IP VC terminal 90 may include inputs such as a microphone, video camera, and keyboard, and may include outputs such as a display and a speaker. The H.323 and T.120 standards may be implemented entirely in software on a computer, or in dedicated hardware, or in some combination of these. Each IP VC terminal 90 typically also includes standard audio and video codecs, such as those described for the PSTN VC terminals 70.

The MCU 20 may communicate with the IP VC terminals 90 over the Internet 80, or with the PSTN VC terminals 70 over the PSTN 60. The MCU 20 may include hardware and/or software implementing the H.323 standard (or the H.320 standard, where the MCU 20 is connected to the PSTN 60) and the T.120 standard, and also includes multipoint control for switching and multiplexing video, audio, and data streams in a multimedia conference. The MCU 20 may additionally include hardware and/or software to receive from, and transmit to, PSTN VC terminals 70 connected to the gateway 30. As shown in FIG. 1, an MCU 20 may reside on one of the racks 10, or may be located elsewhere in the network, such as MCU's 20a and 20b. It will be appreciated that an MCU 20 may also reside on one of the PSTN VC terminals 70, or one of the IP VC terminals 90, and may be implemented in hardware, software, or some combination of these.

The rack 10 may provide additional services for use in a video conferencing network. These may include, for example, audio/video coder/decoders ("codecs") that are not within the H.323 or H.320 standards, such as the G2 encoder and streamer for use with a proprietary streaming system sold by RealNetworks, Inc., and a Windows Media codec for use with proprietary media systems sold by Microsoft Corporation. Other services may include, for example, a directory server, a conference scheduler, a database server, an authentication server, and a billing/metering system.

Figure 2:
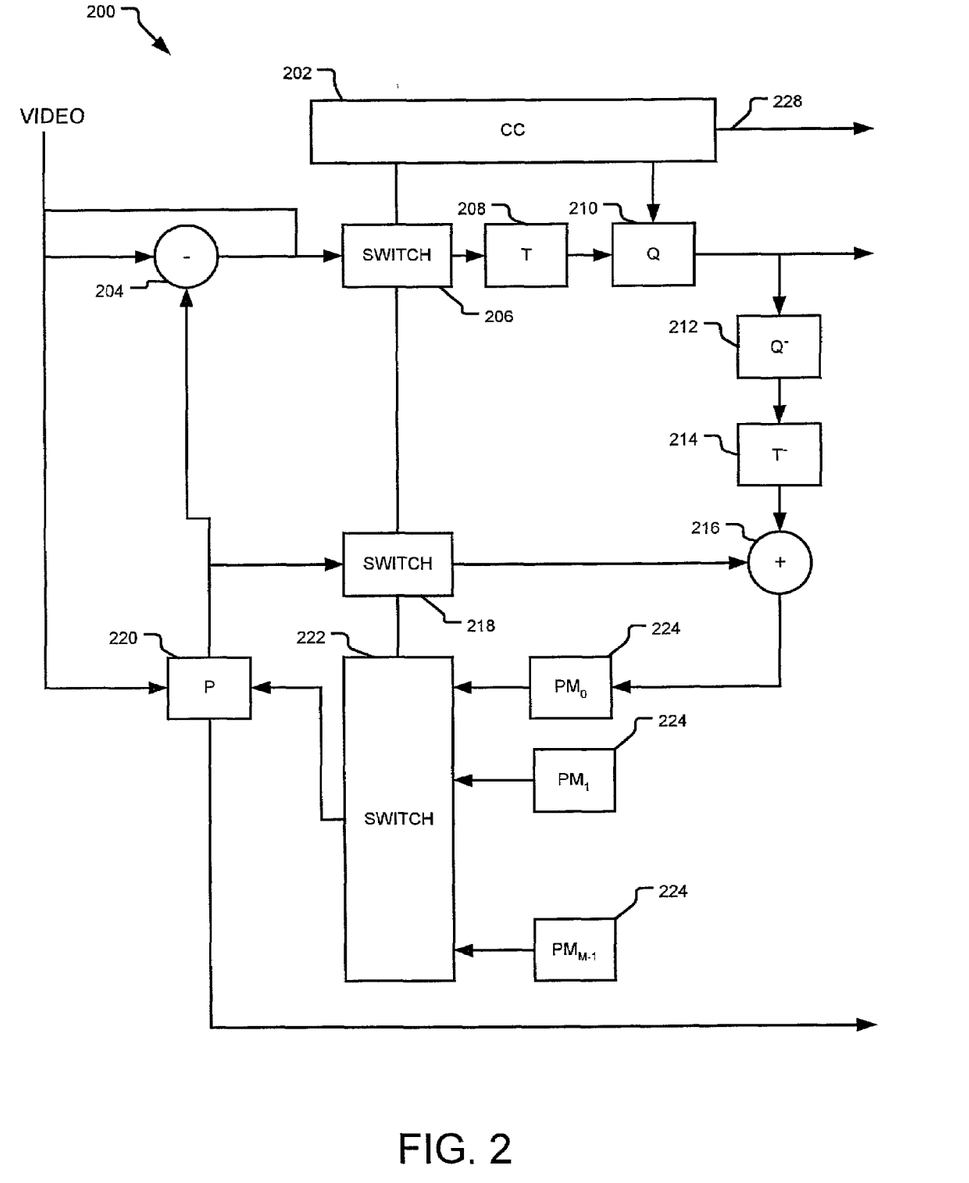
FIG. 2 shows a block diagram of an encoder that may be used in the system of FIG. 1.

FIG. 2 shows a functional block diagram of an encoder that may be used in the system of FIG. 1. An encoder 200 for differential encoding may include a coding control 202, a difference junction 204, a first switch 206, a forward transform 208, a quantizer 210, an inverse quantizer 212, a reverse transform 214, a summing junction 216, a second switch 218, a picture processor 220, a third switch 222, and a picture memory 224 having a plurality of storage locations $PM_0$ through $PM_{M-1}$. The encoder 200 may provide encoded video to a video multiplex coder or other output, as indicated generally by arrows leaving the right-hand side of FIG. 2. In general, the encoder 200 may be adapted to encode differential video data with reference to long-term data or short-term data, and to include the type (i.e., long-term or short-term) of the data referred to in an encoded video signal output. The encoder may also include in the video signal information describing how reconstructed data at a corresponding decoder should be stored (i.e., as long-term or short-term data), and, where appropriate, addressing information for storing the data.

A video input is received by the difference junction 204. It will be appreciated that the video input may be pre-processed into blocks which collectively form an image. The video input is also supplied to the picture processor 220 for comparison to reconstructed previous images. The difference junction 204 may receive predictive or differential image data from the picture processor. Here, video compression may be improved by allowing the system to operate on difference data between a current image and an earlier image. Difference data may be provided from the difference junction 204 to a transform 208 through the first switch 206, which operates under control of the coding control 202 to select between the video input and the difference data. The transform 208 may be, for example, a discrete cosine transform ("DCT") unit that performs a two-dimensional DCT on the difference data or the video input to provide a transformed block.

The transformed block is provided from the transform 208 to the quantizer where each block is quantized using a quantization index to provide a quantized block. Using this technique, each value in the transformed block may be scaled by the quantization index, thus reducing the magnitude of each spatial frequency in the quantized block. The quantization index may vary.

The above encoder 200 may thus produce a compressed video output from the video input. The output from the quantizer 210 may also be fed back to achieve greater compression through differential imaging. The quantizer 210 output may be provided to the inverse quantizer 210 which de-quantizes each block. The inverse transform 214 transforms each de-quantized block from the spatial-frequency domain back into the spatial domain to provide a reverse-transformed block. Any differential data from the picture processor 220 may be added to the reverse-transformed block in the summing junction 216 by closing the second switch 218, thereby generating a reconstructed block that is stored in the picture memory 224. It is noted that each reconstructed block may be identical to a corresponding block generated by a decoder that receives the compressed video output.

Reconstructed blocks from the picture memory 224 may be selected using the third switch 222 and compared to the video input in the picture processor 220, and the picture processor 220 may generate motion vectors describing where in the next image any blocks from the previous image appear. It will be appreciated that suitable motion estimation algorithms for the picture processor 220 are known, and may be used with the systems described herein. Different reconstructed blocks may be used for different video input, as indicated by the third switch 222 which selects a location of the picture memory 224 from which to recall reference data. Selection of picture memory 224 locations for reconstruction may be signaled to a corresponding decoder as described in more detail below. The picture processor 220 may use the motion vectors to generate differential image data. As with other video data, the motion vectors may be forwarded for further processing and eventual transmission to a decoder. A decoder receiving the motion vectors can use them, along with the differential data, to reconstruct a complete image.

Outputs from the encoder 200 may include a flag indicating what type of data is being transmitted (e.g., full image, differential, etc.), a flag indicating whether a block was transmitted, and a quantization index, collectively indicated by an arrow 228. The quanitzation index may include quantization coefficients that are also used by the quantizer 210 and the inverse quantizer 212. Other outputs from the encoder 200 may include transformed output from the quantizer, and motion vectors from the picture processor 220. The coding controller 202 may also output data indicating locations in the picture memory 224 where reference data is stored, using the data structures described below with reference to FIG. 3. As will be appreciated, outputs from the encoder 200 may be subject to further processing, including, for example, variable run length coding or other processing to further compress the transmitted data. In addition, the outputs from the encoder 200 may be multiplexed with outputs from other encoders, as where the video is multi-threaded. In a multi-threaded system, picture memory may also be advantageously shared among different threads.

Although not shown in FIG. 2, it will be appreciated that a decoder may perform complementary functions using the data from the output 226 of the encoder 200. The decoder may, for example, receive and buffer an incoming digital bit stream, and de-multiplex the stream into control data, such as motion vectors, flags, and so forth, and video data, such as the quantizer output from the encoder 200. The decoder may inverse quantize and inverse transform the video data, and combine the video data with reference data, if any, to reconstruct an image, or a block of data from an image. It will further be appreciated that the decoder may employ a back-channel for transmitting information from the decoder to the encoder 200, such as information concerning decoding capabilities, information concerning available buffers (i.e., memory) and buffer allocation, and information concerning data errors.

It will be appreciated that a number of techniques are known for implementing the encoder 200 and the decoder described above. All of the functions, except for analog/digital and digital/analog conversion of the video signal, may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Additionally, a number of video processing chips and chip sets are commercially available that are pre-configured to code and decode certain media streams. Many of these devices may be adapted to operate according to the teachings of the system described herein.

Figure 3:
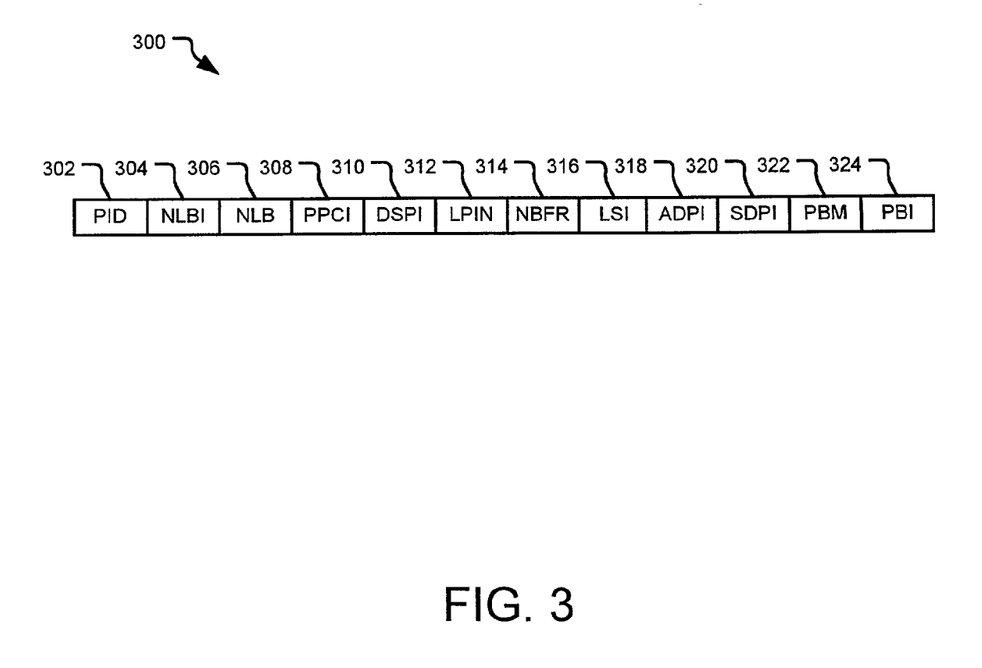
FIG. 3 shows a data structure for a signal that may be used to transmit video data.

FIG. 3 shows a data structure for a signal that may be used to transmit video data. The data structure 300 may be generated, for example, by the encoder 200, with differential video data being obtained through techniques such as motion estimation and transmitted along with the data structure 300. The data structure 300 may include a picture identification ("PID") 302, a number of long-term buffers indicator ("NLBI") 304, a number of long-term buffers ("NLB") 306, a picture property change indication ("PPCI") 308, a difference of short-term picture identifier ("DSPI") 310, a long-term picture index ("LPIN") 312, a number of buffer for remapping ("NBFR") 314, a long-term/short-term buffer indication ("LSI") 316, an absolute difference of picture identification or index ("ADPI") 318, a sign of the difference of picture identification or index ("SDPI") 320, a picture buffering mode ("PBM") 322, and a picture buffer identification or index ("PBI") 324. The data structure 300 may be optionally included in a header, or other descriptive data fields, in a video signal, with a flag indicating the presence of extended video coding information (i.e., the data structure 300).

As will be appreciated from the following description, the data structure 300 generally provides control data for allocating memory between short-term and long-term buffers, for controlling whether and how to store a current image in a short-term or long-term buffer, and for controlling whether and how to access reference images in the short-term or long-term buffers for reconstructing a current image, based upon motion vectors that may be elsewhere in the video signal. The data structure 300 may be used generally to distinguish between short-term and long-term data in a differentially encoded video stream, including multi-threaded streams, and to allocate decoder buffers during decoding in a manner that permits suitable indexing of reference data and flexible allocation of decoder memory (with complementary operations performed in the encoder to maintain consistent reference images). Short-term data may be stored in a first-in-first out manner and referenced based upon sequential numbering of frames of video data, while long-term data may be stored and referenced using indices assigned by an encoder and embedded in the video stream.

It should be appreciated that the terms "short-term" and "long-term", as used herein, are not intended to refer to a specific time duration for data, but rather to refer to reference data that is generally more or less temporally remote to current pictures. Thus short-term data will typically have a shorter useful life for reconstructing a current picture than long-term data. In operation, classification of reference data as short-term or long-term may vary for different encoders, for different video content, or, where a back channel is provided for decoder-to-encoder signaling, for different decoders. The classification may be specified by a user, or may be determined by the encoder in a manner that, e.g., provides optimum compression of the video stream. Further, in video such as multi-threaded video, short-term and long-term data may have different duration for different threads.

It should further be appreciated that a memory as described herein may be considered to have a short-term buffer that contains the short-term picture data, and a separate long-term buffer that contains the long-term picture data, with each buffer addressed according to its own indexing scheme. However, this distinction does not require separate physical memories, and both buffers may reside within a single physical memory.

In the data structure 300, the PID 302 is the identification number of a picture, or still image that makes up a frame of a moving video. The PID 302 may include ten bits. A first coded and transmitted picture may be assigned zero, and each subsequent coded and transmitted picture may have a value that decreases by one in unsigned modulo fashion (ten bit modulo for the example above). The PID 302 may be used as an identifier for a short-term picture, and as an identifier for a short-term buffer that contains short-term image data.

The NLBI 304 may be a one bit flag indicating whether the NLB 306 field exists. If the flag is not set, then the data structure contains no NLB 306. In this case, a decoder receiving the signal may use previously stored NLB data. If no NLB 306 is received by the decoder, then the value for the NLB 306 may be assumed to be zero. If the NLBI 304 flag is set, then the next field may be the NLB 306.

The NLB 306 may be a variable-length field representing the maximum number of long-term buffers allowed for use. All of the LPIN 312 values (described below) may fall between zero and the value for the NLB 306 minus one. A decoder may, upon receiving the NLB 306, mark all long-term buffers with an LPIN greater than then new NLB 306 (minus one) as "unused."

The PPCI 308 may be a two bit field that contains a picture property change indicator. A first value for the PPCI 308 may indicate no change in picture properties, also signaling that no DSPI 310 or LPIN 312 fields follow. A second value for the PPCI 308 may indicate that a short-term picture is to be changed to a long-term picture. In this case, the DSPI 310 may be used to obtain a PID for the target short-term picture, and a LPIN may be assigned based upon the LPIN 312 in the data structure 300. A third value for the PPCI 308 may indicate the removal of a short-term buffer. The short-term buffer identified by the DSPI 310 may then be marked as "unused" so that the associated memory may be free for other uses. In this case, the DSPI 310 is used, but the LPIN 312 is not included in the data structure. A fourth value for the PPCI 308 may indicate that a long-term picture buffer is to be removed. In this case, the long-term picture buffer identified by the LPIN 312 may be marked as "unused." The DSPI 310 is not included in the data structure 300.

The DSPI 310 may be a variable-length field that is included in the data structure 300 for certain of the above cases. In particular, a short-term picture that immediately precedes the current short-term picture may be identified by providing a difference in the PID 302 between the current short-term picture and the previous short-term picture. The DSPI 310 may be combined with the PID 302 in a decoder to identify a previous short-term picture. More particularly, a sum (since the PID 302 decrements) of the DSPI 310 and the PID 302 (plus one) may be determined, and the least significant bits corresponding to the PID 302 modulus (ten in the above example) masked to determine the previous short-term picture. Pseudo-code for this operation, and a corresponding encoder operation is provided below:

```
!Encode
!(10-bit shift used for modulo-10 PID)
MASK = (1<<10)-1;
DSPI = (PIDPrevious - PIDCurrent - 1) & MASK;
!Decode
!(10-bit shift used for modulo-10 PID)
MASK = (1<<10)-1;
PIDPrevious = (DSPI + PIDCurrent + 1) & MASK;
```

Tracking identifiers for short-term pictures in this manner permits relative indexing to continue through a wrap-around of the ten bit PID 302. As will be appreciated, encoding this difference in the video stream may permit relative indexing of short-term image data without requiring rearrangement of buffer indices.

The LPIN 312, which is included in the data structure 300 for certain of the PPCI 308 cases noted above, may be a variable-length value that includes an index of a long-term picture.

The NBFR 314 may be a variable-length value that indicates a number of buffers for remapping. A default mapping may be provided, and may be signaled using the NBFR 314 with a value such as zero. In this case, no values will be provided in the data structure 300 for the LSI 316, the ADPI 318, and the SDPI 320. Another value for the NBFR 314, such as one, may signal a decoder to remap a buffer to the index, zero, which may be used for prediction. The NBFR 314 may otherwise contain a value indicating a number of long-term buffers to be remapped. The number of buffers, N, may create N buffers having indices zero to N–1, and may be used for prediction. In addition, N instances of the LSI 316, the ADPI 318, and the SDPI 320 may be provided, as described below.

The LSI 316 may be a flag indicating whether a long-term buffer index or a short-term buffer identification is to be remapped.

The ADPI 318 may indicate an absolute difference for buffer remapping. The ADPI 318 generally contains a difference for remapping an old index for a buffer to a new index for a buffer so that buffers may be allocated, reallocated, and deallocated dynamically as appropriate for a video stream. If a long-term buffer index is remapped, then the ADPI 318 may contain a difference between a long-term picture buffer to be remapped and the index of an immediately previous remapped long-term buffer (minus one). If the long-term buffer being remapped is the first long-term buffer to be remapped, then the ADPI 318 may be the value of the index of the long-term buffer to be remapped. If a short-term buffer is being remapped, then the ADPI 318 may indicate an absolute difference of the PID of the short-term buffer to be remapped and the PID of the immediately previous remapped short-term buffer (minus one). If the short-term buffer is the first short-term buffer to be remapped, the ADPI 318 may be the difference of the PID of the short-term picture to be remapped and the PID of the current decoded picture (minus one).

The SDPI 320 may be a one bit indication of a sign of the ADPI 318, i.e., a one for a negatively signed value and a zero for a positively signed value. In some cases, such as where a short-term or long-term buffer is the first buffer being remapped, then no sign may be included.

The PBM 322 may be a two bit value signaling a picture buffering mode that determines where a currently decoded picture is stored. A first value may indicate that a currently decoded picture is not to be stored in any buffer. In this case, no value is provided for the PBI 324. A second value may indicate that the currently decoded picture is to be stored as a new short-term picture in first-in-first-out ("FIFO") fashion. In this case, the picture is stored in an 'unused' buffer, if any is available, or else in an oldest short-term picture buffer. The PID 302 for the currently decoded picture then becomes the identifier for that buffer, and no PBI 324 is included in the data structure 300. A third value may indicate that the currently decoded picture is to be stored in a buffer that contains a previously stored short-term picture. In this case, the currently decoded picture may specifically replace an existing short-term picture having a PID derived from the PBI 324 (see below). This mode may be used, for example, to correct errors detected in the short-term buffer. A fourth value for the PBM 322 may indicate that the currently decoded picture is to be stored in a buffer that contains a long-term picture with an index that is derived from the PBI 324 that follows. If there is no long-term buffer having the calculated index, an 'unused' buffer may be used to store the picture. If no 'unused' buffer is available, then the oldest short-term buffer may be used to store the picture, with the buffer becoming a long-term picture buffer with an index derived from the PBI 324 that follows. Optionally, the failure to locate an available long-term buffer may result in an error that can be signaled to an encoder using a back-channel.

The PBI 324 may be a variable-length value indicating an identifier for a short-term picture or an index for a long-term picture. Where the PBM 322 indicates a long-term picture, then the PBI 324 may be used directly as an index for a long-term buffer. Where the PBM 322 indicates a short-term picture, then an identifier for the short-term picture buffer to be replaced may be calculated as the current picture identifier (i.e., the PID 302) plus the PBI 324. The resulting value may be masked, as described above for the DSPI 310, to obtain a ten bit value corresponding to the PID 302.

Where variable-length codes are used in the above signal or data structure, any variable-length coding technique may be used, consistent with the system in which it is deployed. On variable-length coding scheme suitable for use with the systems described herein is provided by the following table, in which data having up to twenty-three significant bits may be encoded. The following may also be adapted to more or less significant bits according to the requirements of a system.

| No. of Bits | Range of Values | Binary Value | Variable-length Code |
|---|---|---|---|
| 1  | 0         | 0                                  | 1 |
| 3  | 1-2       | $x_0+1$                            | $0x_00$ |
| 5  | 3-6       | $x_1x_0+3$                         | $0x_11x_00$ |
| 7  | 7-14      | $x_2x_1x_0+7$                      | $0x_21x_11x_00$ |
| 9  | 15-30     | $x_3x_2x_1x_0+15$                  | $0x_31x_21x_11x_00$ |
| 11 | 31-62     | $x_4x_3x_2x_1x_0+31$               | $0x_41x_31x_21x_11x_00$ |
| 13 | 63-126    | $x_5x_4x_3x_2x_1x_0+63$            | $0x_51x_41x_31x_21x_11x_00$ |
| 15 | 127-254   | $x_6x_5x_4x_3x_2x_1x_0+127$        | $0x_61x_51x_41x_31x_21x_11x_00$ |
| 17 | 255-510   | $x_7x_6x_5x_4x_3x_2x_1x_0+255$     | $0x_71x_61x_51x_41x_31x_21x_11x_00$ |
| 19 | 511-1022  | $x_8x_7x_6x_5x_4x_3x_2x_1x_0+511$  | $0x_81x_71x_61x_51x_41x_31x_21x_11x_00$ |
| 21 | 1023-2046 | $x_9x_8x_7x_6x_5x_4x_3x_2x_1x_0+1023$ | $0x_91x_81x_71x_61x_51x_41x_31x_21x_11x_00$ |
| 23 | 2047-4094 | $x_{10}x_9x_8x_7x_6x_5x_4x_3x_2x_1x_0+2047$ | $0x_{10}1x_91x_81x_71x_61x_51x_41x_31x_21x_11x_00$ |

As may be seen generally in the above table, variable-length codes may be signaled by a leading and trailing zero, with consecutive significant bits offset by ones. As noted above, other variable-length coding techniques are known, and may be used with the systems described herein.

It will be appreciated that further control information may be included where additional layers of data are provided in the video stream. For example, the H.263 standard includes a picture layer, a group of blocks layer, a slice layer, and a macroblock layer. Flags and other signaling information may be included in these layers to indicate the presence of the data structure 300, along with any other control information appropriate to the particular layer. In particular, existing layers may be used to identify a type (e.g., short-term, long-term, or mixed) of reference data used for reconstruction of a current image, along with suitable address information. Address information may be a frame sequence number for short-term data, which is sequentially stored. Address information may be a long-term buffer index for long-term data. Mixed addressing may be provided in, for example, the macroblock layer, with additional fields provided that contain addressing modes and data for each block of the macroblock layer. Signaling may be realized by, for example, including within header information a flag indicating the presence of additional reference information. In this case, the flag may be followed by, for example, temporal reference information, addressing mode (long-term, short-term, mixed), and frame sequence number data, which may be encoded into existing fields of a video conferencing protocol. Suitably enabled decoders may recognize the flag, and as such, identify and apply the changed meaning of data in the existing fields.

Control information for other layers of the H.263 standard may provide for handling of reference and differential image data (such as the "P", "B", and "PB" frames of H.263), including forward and reverse temporal reference information, as well as different addressing modes. For example, the group of blocks or slice layer may include a flag indicating whether a single reference buffer or multiple reference buffers are used for any following macroblocks. Where multiple reference buffers are used, they may be signaled using, for example, a signal such as that shown in the data structure 300 above. Other control information may be signaled in the group of blocks or slice layer, such as an exclusive use of short-term buffers, an exclusive use of long-term buffers, and a mixed mode that uses both short-term and long-term buffers. Similar signaling may be provided for the macroblock layer. An additional layer may be provided for the data structure 300, such as the Enhanced Reference Picture Selection mode described in Annex U of the H.263 Standard.

Figure 4:
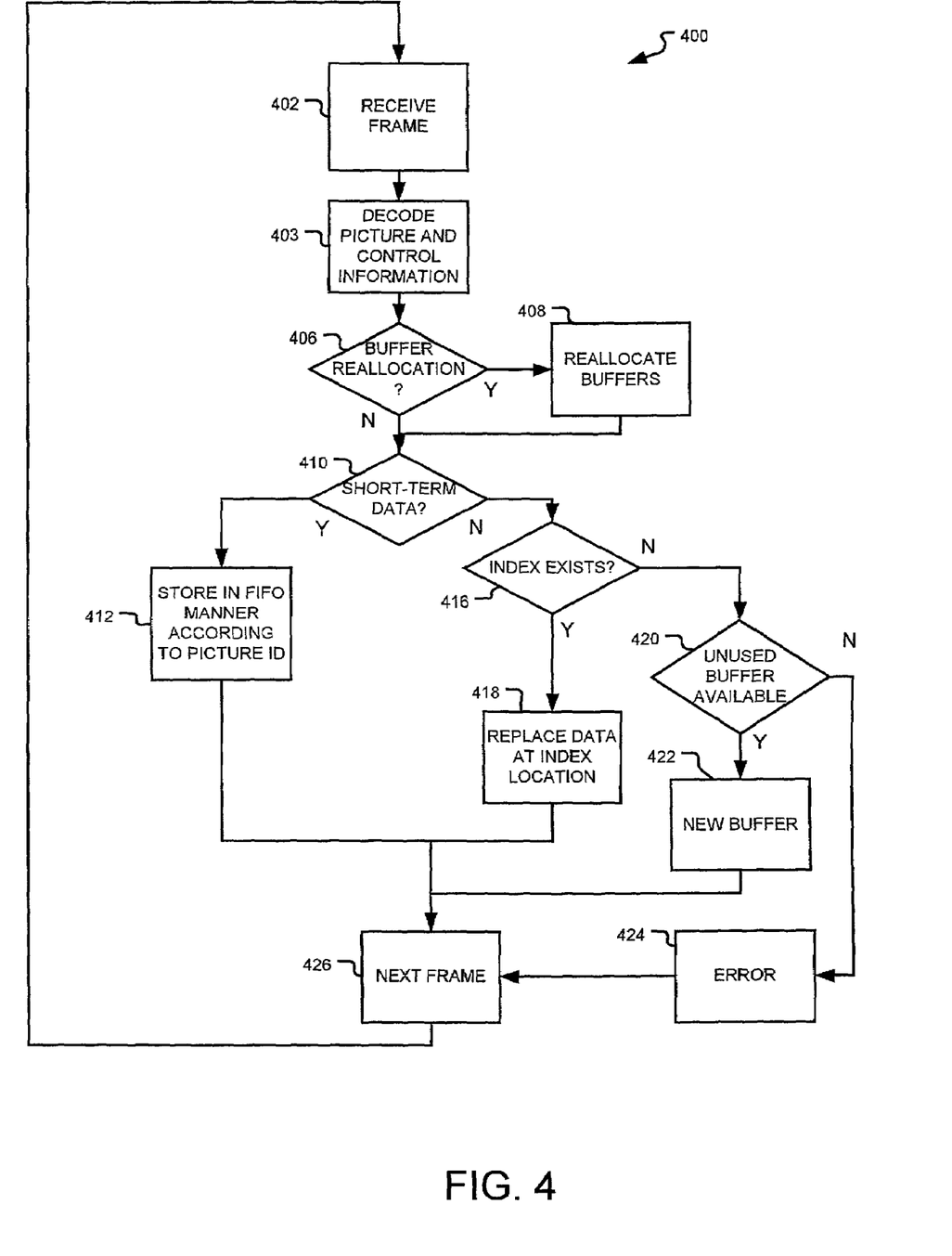
FIG. 4 is a flowchart showing operation of a decoder that receives the data of FIG. 3.

FIG. 4 is a flowchart showing operation of a decoder that receives the data of FIG. 3. The process 400 may repeat, beginning with receiving a frame of data that includes the data structure 300 of FIG. 3, as shown in step 402. As shown in step 403, picture information and control information (also referred to herein as "control data") is decoded from the received frame. The picture may be decoded with reference to video data in the frame of data, such as differential video data, and previously decoded and stored pictures that are in short-term or long-term buffers of the decoder. Where the picture is provided as a reference frame, e.g., as image data rather than differential video data, the image data may be used directly for a picture, and stored as appropriate according to the control data in the frame of data of the video signal.

As shown in step 406, control information in the received frame may be examined to determine whether any buffer reallocation has been signaled using, for example, the NBFR 314 and related data of FIG. 3. If a buffer reallocation is detected in step 406, then the process 400 may proceed to step 408 where buffers are reallocated according to control information decoded from the video stream. If no buffer reallocation is detected then the process may proceed to step 410 where it is determined whether the currently decoded picture should be stored as short-term data (or long-term data).

If it is determined in step 410 that the currently decoded picture is short-term data, then the process 400 may proceed to step 412 where the currently decoded picture may be stored in FIFO manner according to the control information included in the video stream, as described above in reference to FIG. 3. The process 400 may then proceed to step 426 where a next frame may be received. If it is determined in step 410 that the currently decoded picture is not short-term data, i.e., the data is long-term data, then the process 400 may proceed to step 416 where further control information is examined.

In step 416, it is determined whether a buffer exists for an index that is provided in the video stream for long-term data. If an index refers to an existing buffer, then the process 400 may proceed to step 418 where the currently decoded picture may replace data at the index location. If an index refers to a buffer that does not exist, then it is determined whether any unused buffers exist for use as long-term buffers, as shown in step 420. If unused buffers are available, then the process 400 may create a new buffer 422 having the index included in the video stream, as indicated in step 422. If no unused buffers are available, then an error occurs, as shown in step 424. In this case, the error, along with any associated control information, may be signaled to an encoder providing the video stream using a back-channel such as that specified in the H.245 standard. The process 400 may then proceed to step 426 where a next frame of video data may be received.

It will be appreciated that the above process 400 is described with general reference to pictures. However, the process 400, and the data structure 300 may be readily adapted to a mixed addressing mode where, for example, some blocks of a picture are reconstructed with reference to short-term data while other blocks of the same picture are reconstructed with reference to long-term data. The process 400 and the data structure 300 may also be readily adapted to multi-threaded video coding where different threads refer to different short-term or long-term reference images stored in the buffers of the decoder. It should also be appreciated that steps shown in the process 400 are exemplary, and that the steps may be performed in a different order or in parallel, consistent with the systems described herein. All such adaptations are intended to fall within the scope of the invention.

The foregoing process may be realized in software, or in hardware, or in some combination of hardware and software. The process 400 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process 400 may also, or instead, include an application specific integrated circuit, a programmable gate array, programmable array logic, or any other device that may be configured to process electronic signals.

Any combination of the above circuits and components, whether packaged discretely, as a chip, as a chipset, or as a die, may be suitably adapted to use with the systems described herein. The process 400 may also be integrated into a dedicated video processing coder/decoder. It will further be appreciated that the above process 400 may be realized as computer executable code created using a structured programming language such as C, an object oriented programming language such as C++, or any other high-level or low-level programming language that may be compiled or interpreted to run on one of the above devices.

Figure 5:
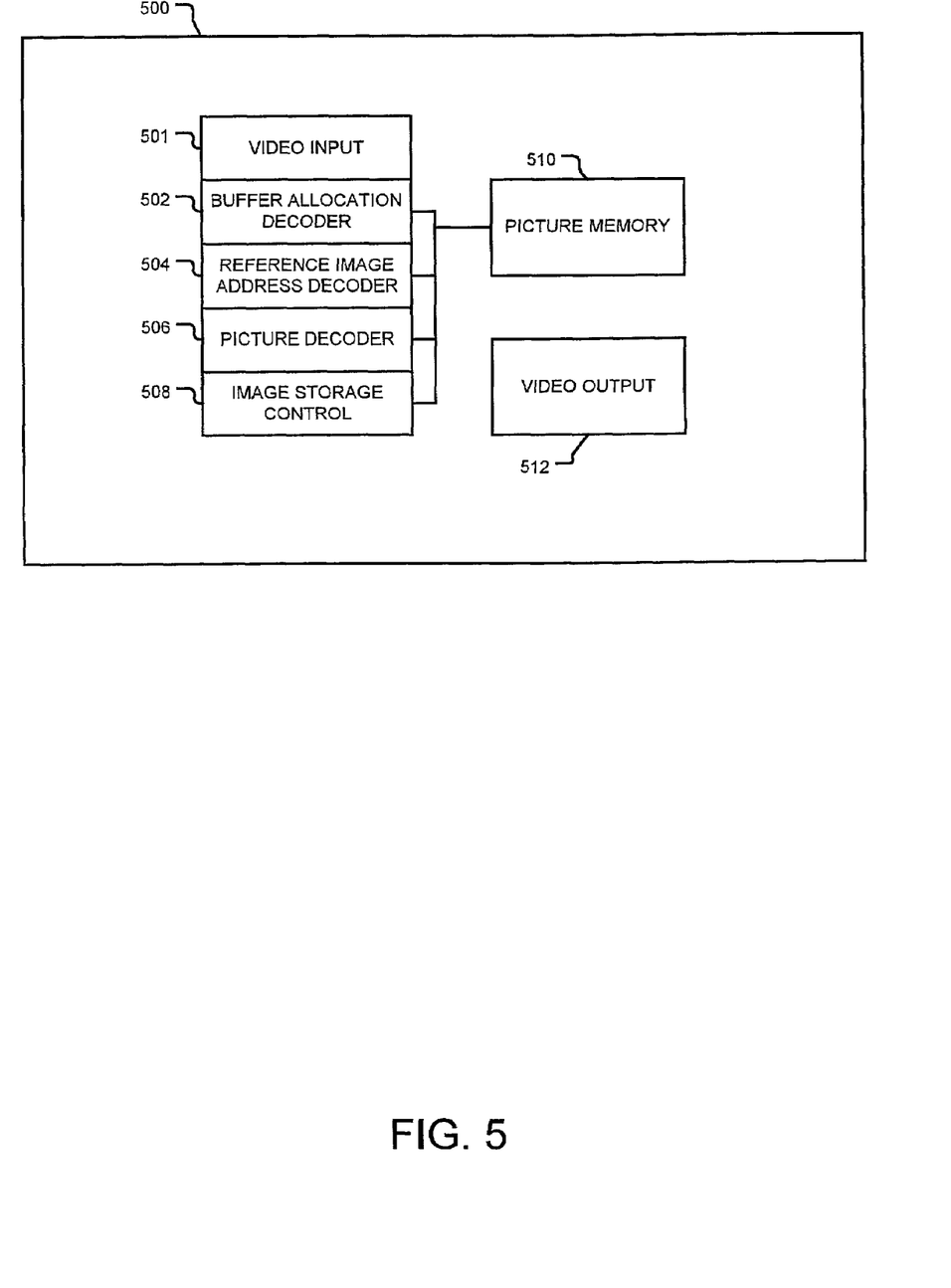
FIG. 5 is a block diagram of a decoder according to the principles of the invention.

FIG. 5 is a block diagram of a decoder according to the principles of the invention. The decoder 500 may include a video input 501, a buffer allocation decoder 502, a reference image address decoder 504, a picture decoder 506, an image storage control 508, a picture memory 510, and a video output 512. The video input 501 may receive video signals including video data and signals (or data structures) such as those depicted in FIG. 3. The video input 501 may convert received signals into a form suitable for further processing.

The buffer allocation decoder 502 may decode control information in the video signal that relates to allocation of buffers in the picture memory 510. Buffers may be allocated, reallocated, or deallocated according to the description provided above. The reference image address decoder 504 may decode an address for a reference image in the picture memory 510, which may be stored in a long-term buffer according to an index, or a short-term buffer according to a sequential picture identifier, as described in greater detail above. Once the reference image address decoder 504 has identified data in the picture memory 510 that may be used as reference data, the picture decoder 506 may decode a new image using the reference data and differential data included in the video signal. The image storage control 508 may then control storage of the new image in a suitable location, as identified in the video signal, within the picture memory 510. The video output 512 may output frames of moving video in any suitable form.

It will be appreciated that the decoder 500, as with the process 400 of FIG. 4, may be realized in any combination of software and hardware. The picture decoder 506 may decode the video signal into frames of a moving image using a number of different standards including H.263, MPEG, and so forth, and may be based in part upon commercially available codec hardware or software.

While the invention has been disclosed in connection with the preferred embodiments shown and described in detail, various modifications and improvements thereon will become readily apparent to those skilled in the art. Accordingly, the spirit and scope of the present invention is to be limited only by the following claims, which should be interpreted in the broadest sense allowable by law.

What is claimed is:

1. A method comprising:
providing a memory;
allocating the memory between a first buffer and a second buffer;
receiving a video signal that includes video data for reconstructing an image;
generating image data representative of the image from the video data;
decoding control data from the video signal that specifies whether the image data is long-term data or short-term data;
storing the image data in the first buffer when the image data is short-term data; and
storing the image data in the second buffer when the image data is long-term data.

2. The method of claim 1 further comprising decoding data from the video signal that identifies the image data as short-term data or long-term data.

3. The method of claim 2 further comprising decoding an index from the video signal, when the image data is long-term data, that specifies a location of the second buffer, and storing the long-term data in the location.

4. The method of claim 1 further comprising decoding control data from the video signal that specifies whether the image data is to be reconstructed from a reference image in a short-term buffer or a long-term buffer, and selecting a reference image from one of a short-term buffer or a long-term buffer according to the control data.

5. The method of claim 1 further comprising reconstructing a first portion of the image using a first reference image in a short-term buffer, and reconstructing a second portion of the image using a second reference image in a long-term buffer.

6. The method of claim 1 wherein storing the image data in the first buffer includes at least one of:
storing the image data in a first location that is unused, when an unused location exists; and
storing the image data in a second location that contains a least recently received image data, when no unused location exists.

7. The method of claim 1 wherein the video signal includes a first parameter that specifies that the image data is long-term data and a second parameter that specifies a location of the second buffer where the image data should be stored.

8. The method of claim 1 further comprising decoding from the video signal a new allocation of the memory between one or more short-term buffers and one or more long-term buffers.

9. The method of claim 1 wherein the video signal includes at least one of a block, a group of blocks, a macroblock, or a frame.

10. The method of claim 1 further comprising detecting an error in the video data and signaling the error to an encoder on a back-channel.

11. The method of claim 1 further comprising decoding one or more variable length fields in the video signal.

12. The method of claim 1 wherein the short-term data in the first buffer is stored in a first-in-first-out manner and indexed sequentially.

13. The method of claim 1 wherein the long-term data in the second buffer is stored according to a long-term buffer index included in the video signal.

14. The method of claim 1 further comprising deallocating at least one of the first buffer or the second buffer based upon allocation data decoded from the video signal.

15. The method of claim 1 wherein the video data includes differential video data that specifies differences between the image and a reference image.

16. The method of claim 1 wherein the video data is reference data for the image, the reference data being used as the image data.

17. A computer program product comprising:
computer executable code for allocating a memory between a first buffer and a second buffer;
computer executable code for decoding a video signal that includes video data for reconstructing an image;

computer executable code for generating image data representative of the image from the video data;
computer executable code for decoding control data from the video signal that specifies whether the image data is long-term data or short-term data;
computer executable code for storing the image data in the first buffer when the image data is short-term data; and
computer executable code for storing the image data in the second buffer when the image data is long-term data.

18. A video processing system comprising:
a memory;
an allocating means for allocating the memory between a first buffer and a second buffer;
a receiving means for receiving a video signal that includes video data for reconstructing an image;
a generating means for generating image data representative of the image from the video data;
a decoding means for decoding control data from the video signal that specifies whether the image data is long-term data or short-term data; and
a storing means for storing the image data in the first buffer when the image data is short-term data, and for storing the image data in the second buffer when the image data is long-term data.

19. A method comprising:
providing a memory;
allocating the memory between a short-term buffer and a long-term buffer;
storing a long-term reference image in the long-term buffer and a short-term reference image in the short-term buffer;
receiving a video signal that includes video data for reconstructing an image;
decoding control data from the video signal that specifies a reference image for reconstructing the image, the reference image being at least one of the short-term reference image or the long-term reference image; and
generating image data representative of the image from the video data and the reference image.

20. A method comprising:
providing a memory;
allocating the memory between a short-term buffer and a long-term buffer;
storing a long-term reference image in the long-term buffer and a short-term reference image in the short-term buffer;
receiving a video signal that includes video data for reconstructing an image;
decoding first control data from the video signal that specifies a reference image for reconstructing the image, the reference image being at least one of the short-term reference image or the long-term reference image;
generating image data representative of the image from the video data and the specified reference image;
decoding second control data from the video signal that specifies a buffer for storing the image data, the specified buffer being at least one of a second short-term buffer or a second long-term buffer; and
storing the image data in the specified buffer.

21. A method comprising:
providing a memory;
allocating the memory between a short-term buffer and a long-term buffer;
storing a long-term reference image in the long-term buffer and a short-term reference image in the short-term buffer;
receiving a video signal that includes video data for reconstructing an image;
decoding control data from the video signal that specifies a reference image for reconstructing the image, the reference image being at least one of the short-term reference image or the long-term reference image; and
generating image data representative of the image from the video data and the reference image.

22. A decoder comprising:
a memory;
a buffer allocation decoder configured to allocate the memory between a long-term buffer and a short-term buffer;
a video input that receives a video signal that includes video data for reconstructing an image;
a picture decoder that generates image data representative of the image from the video data; and
an image storage control that decodes control data from the video signal that specifies whether the image data is long-term data or short-term data, and stores the image data in the short-term buffer when the image data is short-term data, and stores the image data in the long-term buffer when the image data is long-term data.

23. A data signal embodied on a video conferencing carrier wave, the data signal comprising:
a picture identification number assigned sequentially to a picture;
a flag that indicates whether the data signal includes a number of long-term buffers value;
a picture property change indicator that indicates a change of image data between short-term data, long-term data, and unused data;
a number of buffers for remapping field specifying reallocation instructions;
a picture buffering mode that signals a way that a current image is to be stored, the way being at least one of as a long-term image or a short-term image; and
a picture buffer identification that signals a location where a current image is to be stored, the location being at least one of an index for a long-term buffer or an identification number for a short-term buffer.

24. The data signal of claim 23 further comprising a number of long-term buffers value that specifies a maximum number of long-term buffers allowed for use by a decoder receiving the data signal.

25. The data signal of claim 23 further comprising address information for changing picture properties, the address information including at least one of a difference of short-term picture identifier specifying a difference between a current short-term picture and a previous short-term picture, or a long-term picture index specifying an index for a long-term buffer.

26. The data signal of claim 23 further comprising a long-term/short-term buffer indication, an absolute difference of picture identification, and a sign of difference of the absolute difference.

* * * * *